United States Patent [19]

Flowers et al.

[11] 4,254,071
[45] Mar. 3, 1981

[54] METHOD OF PREPARING ELECTROSTATIC COATING COMPOSITIONS CONTAINING AN EPOXY RESIN

[75] Inventors: Ralph G. Flowers; Frank S. Nichols, both of Pittsfield; Robert P. Anderson, Dalton, all of Mass.

[73] Assignee: General Electric Company

[21] Appl. No.: 970,249

[22] Filed: Dec. 18, 1978

[51] Int. Cl.³ .............................................. B29B 3/04
[52] U.S. Cl. ............................... 264/102; 174/110 E; 525/58; 264/141; 264/331
[58] Field of Search ................. 427/27, 116, 117, 118, 427/120, 358, 195; 260/42.51, 37 EP, 29.3; 264/140, 102, 141, 331; 174/110 E; 252/63.2

[56] References Cited

U.S. PATENT DOCUMENTS

| | | | |
|---|---|---|---|
| 3,239,598 | 3/1966 | Olson et al. | 427/116 X |
| 3,923,947 | 12/1975 | Cook | 264/141 |
| 3,932,689 | 1/1976 | Watanabe et al. | 260/831 X |
| 3,936,522 | 2/1976 | Franz | 264/141 |
| 4,009,224 | 2/1977 | Warnken | 260/837 R |
| 4,072,795 | 2/1978 | Noonan | 427/27 X |
| 4,088,809 | 5/1978 | Elbling et al. | 427/120 X |

Primary Examiner—Ralph S. Kendall
Assistant Examiner—Thurman K. Page
Attorney, Agent, or Firm—Richard A. Menelly; Francis X. Doyle

[57] ABSTRACT

Insulating coating compositions for electrical wire are prepared by a method which includes a dehydration process to prevent any reaction from occurring between adsorbed moisture and the catalyst before the coating is electrostatically applied to the transformer wire.

7 Claims, 2 Drawing Figures

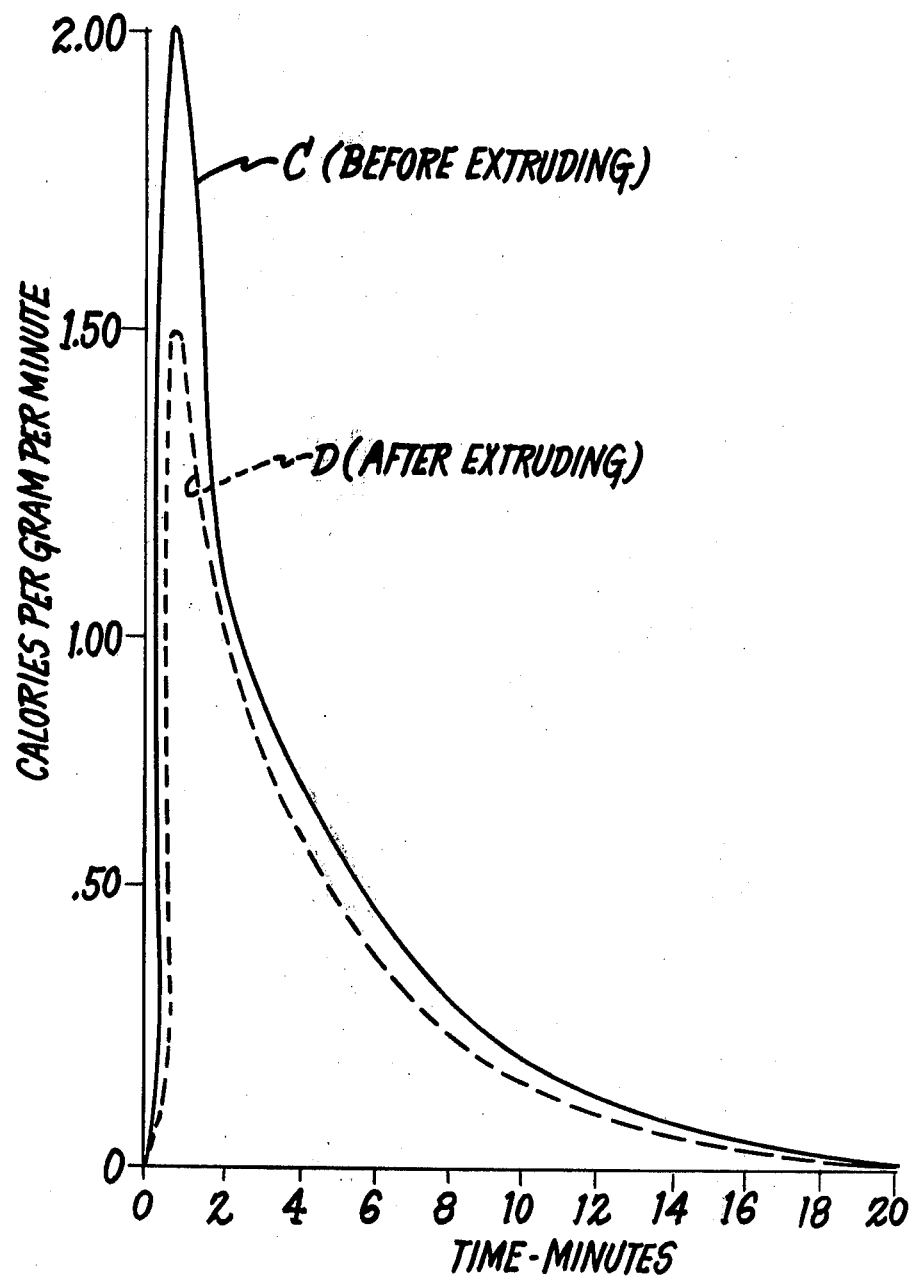

METHOD OF PREPARING ELECTROSTATIC COATING COMPOSITIONS CONTAINING AN EPOXY RESIN

BACKGROUND OF THE INVENTION

Insulating coating compositions for applying to transformer wire are disclosed in commonly assigned U.S. patent applications Ser. Nos. 697,838 now abandoned and 889,889. The electrically insulating coating materials disclosed in the aforementioned applications comprise the reaction product of a mixture of polyvinyl acetal, phenol aldehyde resin and epoxy resin in a particular range of proportions. The mixture is formed into a powder for applying to wire without the use of solvents. The coated wire is then heated to cure and harden the applied coating.

The aforementioned resin composition requires the addition of a prescribed amount of a curing agent which is designed to react and harden the coating into a tough flexible adherent layer during a thermally controlled coating process. The premixed powder including the curing agent is electrostatically applied to wire which is then heated to cause the resin composition to react with the curing agent.

A preferred method of manufacturing the powder described in the above patent applications is to preblend the ingredients at room temperature and then to pass this premix through an extruder in order to prepare a homogeneous blend. Typically, the extruder will be operated at a temperature of 125° to 150° C. The extrudate is cooled and chopped into small granules which are subsequently ground to a fine powder of suitable particle size distribution.

The ingredients of the premix will normally contain moisture which has been adsorbed from the atmosphere. It has been discovered that when such a premix containing moisture is passed through the heated extruder excessive loss of curing activity takes place, presumably by reaction of the curing agent with water, rendering it nonactive. The resultant powder when applied to wire does not produce a coating having the desired properties, specifically it is lacking in flexibility. If on the other hand the premix is dried prior to extrusion a much smaller loss of reactivity takes place and the resultant powder produces a coating having the desired properties including flexibility.

The amount of water present in the undried premix and the harmful effect will depend on the atmospheric relative humidity. It has been discovered that the moisture content may commonly be as high as 2.5% and it must be reduced to less than 0.5% to produce satisfactory coatings.

SUMMARY OF THE INVENTION

Insulating coating premixes for wire coatings are dehydrated prior to extrusion mixing to prevent a reaction between the curing agent and adsorbed moisture. The coating consisting of 25%–65% polyvinyl acetal resin, 10%–40% phenol aldehyde resin, 7%–60% epoxy resin and including about 0.5% curing agent is evacuated to remove any moisture in excess of 0.5% by weight. The dehydrated coating composition results in coated transformer wire having excellent flexibility.

BRIEF DESCRIPTION OF THE DRAWINGS

FIG. 2 is a graphic representation of the corresponding exothermic reaction rate of the coating premix before and after extrusion for a dehydrated premix in accordance with the invention.

DESCRIPTION OF THE PREFERRED EMBODIMENT

Figure 1:
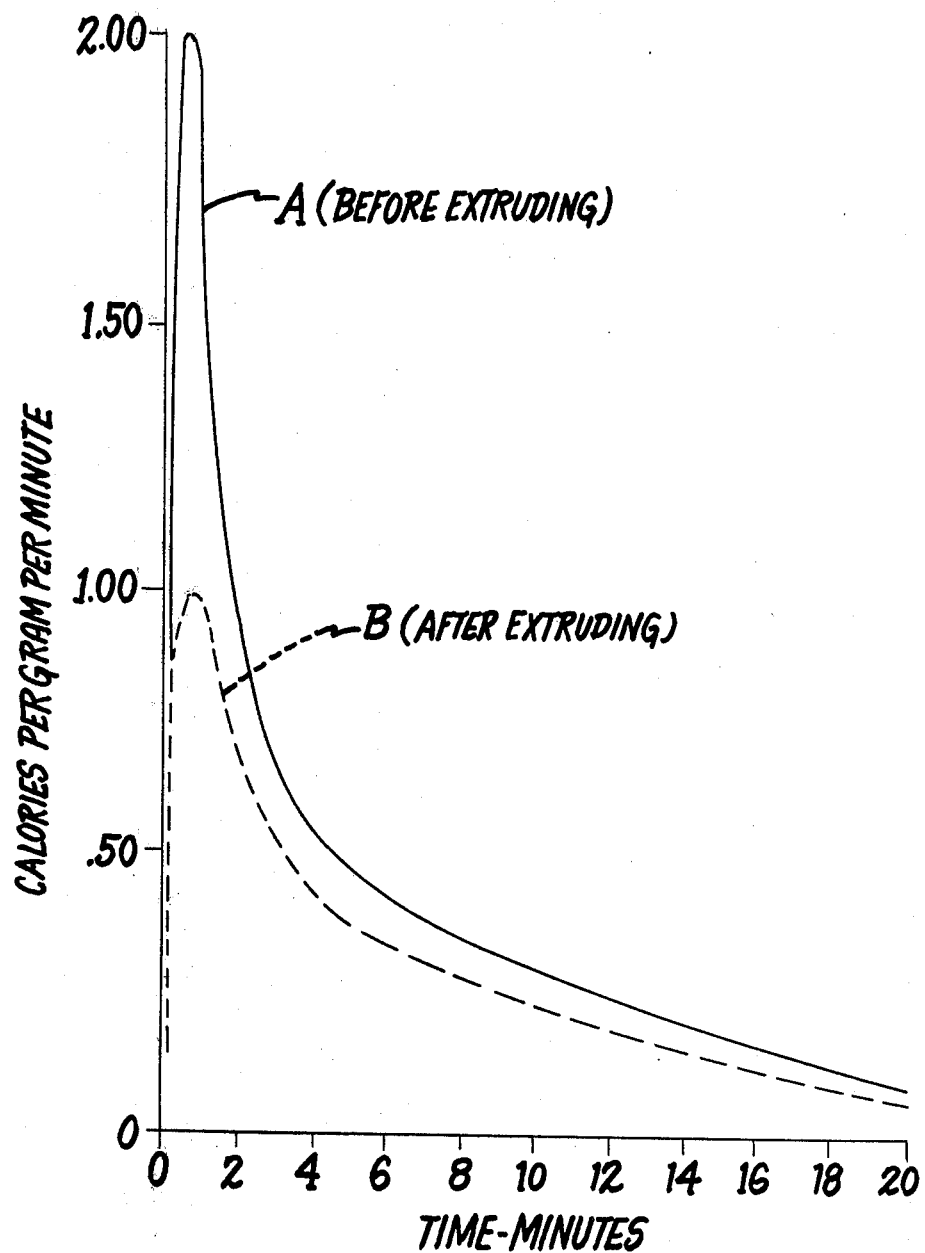
FIG. 1 is a graphic representation of the exothermic reaction rate at a temperature of 200° C., of the undried premix composition as a function of time, before and after extrusion.

In order to determine the nature and extent of the moisture-curing agent reaction, a series of calorimetric analyses were performed on the wire coating premix before and after extrusion mixing. The coating premix was prepared in the manner described in the aforementioned U.S. patent applications wherein approximately 44 parts polyvinyl acetal resin, 20 parts phenol aldehyde resin, 26 parts epoxy resin with 0.50 parts of zinc octoate curing agent were mixed together to form the premix. Room temperature ambient conditions, temperature and relative humidity were noted at 25° C. and 50% respectively, and the moisture content of the premix was determined to be 2.2% under these ambient conditions. The calorimetric measurements were taken at 200° C. to determine the rate of the exothermic cure reaction. The exothermic reaction rate for the premix is shown at A in FIG. 1 before being extruded to mix the premix into a homogeneous composition.

During the extrusion process the premix is forced through a twin screw extruder where it is homogeneously combined when heated to approximately 150° C. The exothermic reaction is shown at B in FIG. 1 after extrusion. It is to be noted that the catalytic activity, as determined by the difference in exothermic reaction rate before and after extrustion, is substantially less after the extrusion process. It is presumed that the zinc octoate curing agent partially reacted with the adsorbed moisture within the premix so that less curing agent was available for curing the resin in the final coating process. The nature of the reaction between zinc octoate and water is not at this time well understood but is believed to involve the hydrolysis of the zinc octoate to zinc oxide which is noncatalytic for the reaction. Other curing agents such as acid anhydrides and other organometallic compounds besides metal octoates are expected to exhibit the same hydrolysis reaction.

After the thermal extrusion mixing process the extrudate is then ground into a powder for applying to the wire.

for purposes of this disclosure the terms "moisture" and "water" are used interchangeably in order to describe the effect of moisture. A second premix was dehydrated by evacuation at room temperature for 24 hours. Moisture determinations were made by weighing prescribed amounts of the coating premix before and after dehydration. As discussed earlier, the coating premix which contained 2.2% by weight adsorbed water before dehydration measured a 0.5% moisture content in the dried premix.

The exothermic reaction rate occuring in the dehydrated premix is shown at C in FIG. 2. The exothermic reaction rate for the same dehydrated premix after the heated extrusion process is shown at D for comparison purposes. It is readily noted that the difference in reactivity of the product can be estimated by the difference in energy peaks between samples D in FIG. 2 and B in FIG. 1 and that the dehydration process substantially improves the reactivity.

After extrusion and grinding, the powders prepared from premixes having 0.5% and 2.2% moisture content were electrostatically applied to separate wires and flexibility measurements were taken on the coated wires. It was then observed that the wires coated with the powder from the dehydrated premix exhibited greater flexibility than the wires coated with powder from premix containing 2.2% moisture content.

Comparisons between the coated wire flexibility determinations made from coating premixes having differing water content revealed that the flexibility of the coated wire is strongly effected by the quantity of water adsorbed in the coating premix. For rectangular cross section transformer wire the flexibility test consisted in providing a 90 degree edge bend to the wire after the wire was subjected to a 15% stretch. The coating must remain intact after the 90 degree bend in order to successfully pass the flexibility test. Wires experiencing cracks of the coating failed the flexibility test.

Wire coated with powder prepared from the dried premixes consistently passed the flexibility test whereas wire coated from powders prepared from premixes with a high moisture content failed the test.

Attempts to compensate for loss of curing agent activity by increasing the amount of curing agent in the undried premixes were unsuccessful since the extra curing agent produced powder having unsatisfactory flowout characteristics on the wire.

Although the method for dehydrating the coating premix comprises evacuation at room temperature for a time increment of approximately 24 hours, it is to be well understood that shorter evacuation times and higher evacuation temperatures, within the range of from 25° C. to 125° C., can be employed providing the temperatures employed do not approach the reaction temperature between the moisture and the curing agent.

Although the dehydrated premix is disclosed for use with transformer wire this is by the way of example only. The insulating coating of the invention can be employed wherever insulating coatings are required.

What we claim as new and desire to secure by Letters Patent of the United States is:

1. A method for preparing an insulating coating for electrostatic powder application comprising the steps of:
    preparing a coating premix consisting of a composition of resins including an epoxy resin and a curing agent selected from the group consisting of acid anhydrides and organometallic compounds
    dehydrating the premix by heating within a first temperature range of from 25° C. to 125° C. to remove any moisture contained therein;
    extruding the dehydrated premix through an extruder at a temperature range of 125° C. to 150° C. for providing a homogeneous mixture;
    cooling the extruded mixture; and
    grinding the extruded mixture into a powder.

2. The method of claim 1 wherein the resin composition comprises a mixture of polyvinyl acetal resin and phenol aldehyde resin with said epoxy resin.

3. The method of claim 1 wherein the polyvinyl acetal comprises 25%–65% by weight, the phenol aldehyde comprises 10%–40% by weight and the epoxy comprises 7%–60% by weight.

4. The method of claim 1 wherein the epoxy curing agent comprises from 0.10% to 1.00% by weight of the composition.

5. The method of claim 1 wherein the step of dehydration includes evacuating the premix.

6. The method of claim 1 wherein the extrusion comprises passing the composition through a twin screw extruder.

7. The method of claim 1 wherein the premix is dehydrated to a moisture content of less than 0.5% by weight.

* * * * *